US011196913B2

United States Patent
Kuroda (10) Patent No.: US 11,196,913 B2
(45) Date of Patent: Dec. 7, 2021

(54) CONTROL APPARATUS, METHOD FOR CONTROLLING SAME, AND NON-TRANSITORY COMPUTER-READABLE STORAGE MEDIUM

(71) Applicant: CANON KABUSHIKI KAISHA, Tokyo (JP)

(72) Inventor: Tomoki Kuroda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/945,250

(22) Filed: Jul. 31, 2020

(65) Prior Publication Data

US 2021/0037177 A1 Feb. 4, 2021

(30) Foreign Application Priority Data

Aug. 2, 2019 (JP) .............................. JP2019-143311

(51) Int. Cl.
*H04N 5/232* (2006.01)
*H04N 7/18* (2006.01)

(52) U.S. Cl.
CPC ..... *H04N 5/23206* (2013.01); *H04N 5/23222* (2013.01); *H04N 5/23299* (2018.08)

(58) Field of Classification Search
CPC ........... H04N 5/23206; H04N 5/23299; H04N 5/23222
See application file for complete search history.

(56) References Cited

U.S. PATENT DOCUMENTS

| 6,836,287 B1 * | 12/2004 | Nakahara ......... H04N 21/25875 348/211.12 |
| 8,683,550 B2 * | 3/2014 | Hung .................... H04W 12/08 726/2 |
| 8,826,388 B2 * | 9/2014 | Peterson ............. H04L 63/0272 726/4 |
| 2017/0324893 A1 * | 11/2017 | Matsuda ............ H04N 21/4882 |

FOREIGN PATENT DOCUMENTS

| JP | 3880495 B2 | 2/2007 |
| JP | 4733942 B2 | 7/2011 |

* cited by examiner

*Primary Examiner* — Christopher K Peterson
(74) *Attorney, Agent, or Firm* — Cowan, Liebowitz & Latman P.C.

(57) ABSTRACT

This invention provides a control apparatus that controls a pan-head including a drive unit for driving an image capturing device, the control apparatus comprising a control unit that controls the drive unit according to a request received via a communication unit; a determination unit that, in a case in which a connection request is received from a terminal, determines whether a first application program for configuration setting relating to the pan-head or a second application program for remote control of the pan-head is being executed in the terminal; a management unit that manages a terminal authorized for connection; and a decision unit that, in a case in which a new connection request is received, decides whether connection is possible or impossible on the basis of the determination by the determination unit and information managed by the management unit.

10 Claims, 4 Drawing Sheets

CONTROL APPARATUS, METHOD FOR CONTROLLING SAME, AND NON-TRANSITORY COMPUTER-READABLE STORAGE MEDIUM

BACKGROUND OF THE INVENTION

Field of the Invention

The present invention relates to a control apparatus, a method for controlling the same, and a non-transitory computer-readable storage medium for controlling an image capturing device controlled remotely.

Description of the Related Art

Remote capturing systems in recent years have included a camera and a pan-head which capturing images using wireless or wired communication means to remotely control an image capturing device such as a camera. Such systems, for example, have an objective of capturing images from a place usually inaccessible to people such as high above a sports stadium and providing images with extra value. Also, by installing in advance a remote capturing system with a pan-head capable of being driven to pan, tilt, and roll at a stadium, the pan-head and the camera can be remotely controlled to capture images during the game from user-preferred directions from other locations in the stadium or from outside the stadium.

A remote capturing system including a camera and a pan-head such as that described above is remotely controlled by a plurality of operating terminals provided in a network. Thus, which operating terminal has control right of the remote capturing system must be decided.

Attempting to solve this problem, Japanese Patent No. 4733942 (hereinafter, Patent Document 1) describes a system including one camera connected to a server, with a plurality of terminals accessing the camera via the server. In Patent Document 1, the terminals each have a user ID (identification), and control right of the server is granted in order of access. In another example, Japanese Patent No. 3880495 (hereinafter, Patent Document 2) describes a system remotely controlled from a plurality of external devices. In the technology of Patent Document 2, a schedule is executed in which a control authorization level, an authorized address, and control data are set for a plurality of times. When a control instruction is received while the schedule is being executed, whether or not to authorize the instruction is decided on the basis of the authorized address, the control authorization level, and the like.

However, a remote capturing system may include not just operating terminals for remote control, but also operating terminals with different control capabilities. For example, in the case of a remote capturing system being installed in a sports stadium, the system may include an operating terminal for on-site problem management or settings and an operating terminal for capturing images of the sport for content creation. Such known technologies cannot always reliably give priority to operating terminals used on site.

SUMMARY OF THE INVENTION

According to an aspect of the invention there is provided a control apparatus that controls a pan-head, to which an image capturing device is mountable and which includes a drive unit that drives the image capturing device, the apparatus comprising: a communication unit that communicates with a terminal on a network; a control unit that controls the drive unit according to a request received via the communication unit; a determination unit that, in a case in which a connection request is received from a terminal via the communication unit, determines whether a first application program for configuration setting relating to the pan-head or a second application program for remote control of the pan-head is being executed in the terminal; a management unit that manages a terminal authorized for connection; and a decision unit that, in a case in which a new connection request is received, decides whether connection is possible or impossible on the basis of a result of a determination of the determination unit and information managed by the management unit.

According to the present invention, with the control apparatus for the pan-head on which the image capturing device can be mounted, only a single device, an operating terminal used for remote control or configuring settings, is allowed to connect based on priority granted to operating terminals corresponding to types of operation. This allows trouble relating to connection to be prevented.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The first embodiment will be described in detail below with reference to FIGS. 1 through 6. Note that configurations and operation objectives of devices as a whole, image processing contents, various controlled devices, and processing results and control results relating to an image processing method will be described in detail. However, it should be understood that these are merely embodiments to facilitate understanding of the concept of the invention. In other words, the configurations and operation objectives of devices, image processing contents, parameters used in processing, various controlled devices, and the like may be configured in a discretionary manner depending on the objective of the devices as a whole. For example, in another embodiment, a user interface for settings may be provided, or a process algorithm, a program, or the like may be used to dynamically decide the settings.

Figure 1:
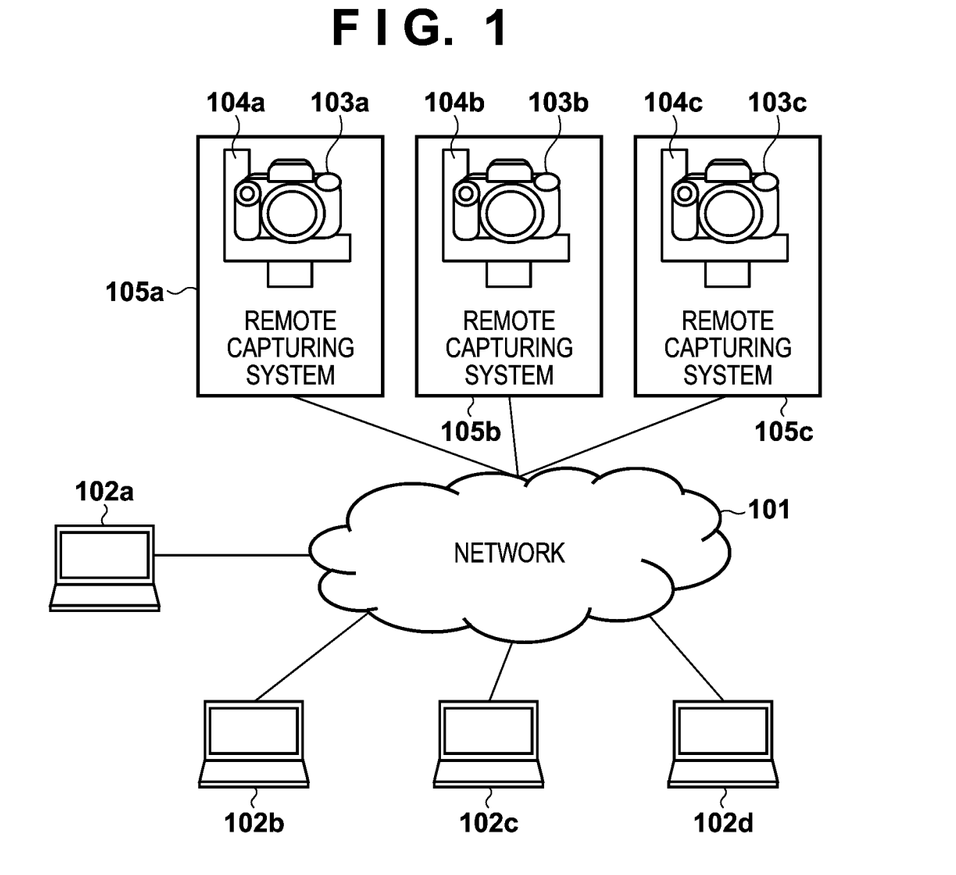
FIG. 1 is a configuration diagram illustrating the overall configuration of a system according to an embodiment.

FIG. 1 is a schematic view illustrating the overall configuration of a system according to the present embodiment. The system includes image capturing devices 103a through 103c that capture images or moving images, pan-heads 104a through 104c mounted on the image capturing devices 103a through 103c capable of movement, relating to line of sight, such as pan, tilt, and roll, and remote capturing systems 105a through 105c including the image capturing devices 103a through 103c and the pan-heads 104a through 104c, the remote capturing systems 105a through 105c controlling the image capturing devices 103a through 103c and the pan-heads 104a through 104c. Also, the system includes operating terminals 102a through 102d capable of remotely controlling, via a network 101, the remote capturing systems 105a through 105c (the image capturing devices 103a through 103c and the pan-heads 104a through 104c).

In the case of a large-scale system including a plurality of cameras and pan-heads, the system may be configured to capture images of a plurality of subjects with the cameras at different locations. In the system, the image capturing devices 103a through 103c and the pan-heads 104a through 104c are remotely controlled. The operating terminals 102a through 102d, for example, are mobile phones, personal computers, tablet terminals, game consoles, and the like. Other devices may also be used.

Note that in the drawings, three remote capturing systems and four operating terminals are illustrated. However, the number of these systems and terminals is not particularly limited. It should be understood that FIG. 1 illustrates merely an example.

Also, hereinafter, when describing one of the remote capturing systems 105a through 105c, the "remote capturing system 105" will be used, with the attached letters a, b, c being omitted. For the same reason, "image capturing device 103", "pan-head 104", and "operating terminal 102" will be used with the attached letters.

Figure 2:
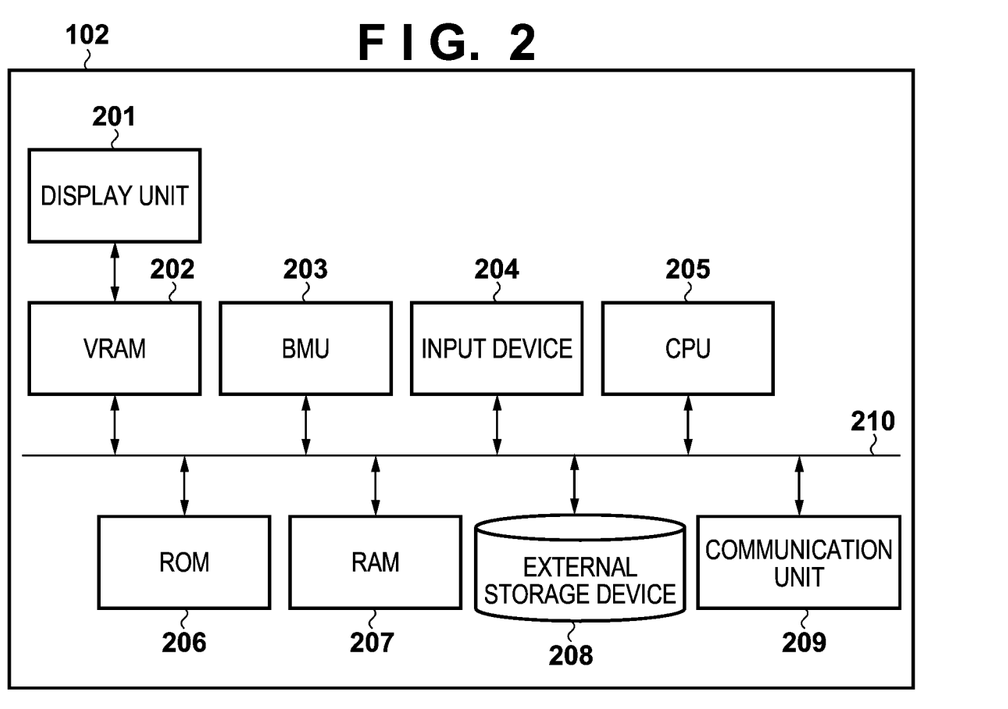
FIG. 2 is a block diagram of a terminal device according to an embodiment.

FIG. 2 is a block configuration diagram illustrating the operating terminal 102. The operating terminal 102 includes a display unit 201, a VRAM 202, a bit move unit (BMU) 203, an input device 204, a CPU 205, a ROM 206, a RAM 207, an external storage device 208, and a communication unit 209. A CPU bus 210 includes an address bus, a data bus, and a control bus. An LCD display device, for example, is used in the display unit 201. Images for display on the display unit 201 are rendered in the VRAM 202. The image data generated in the VRAM 202 is transferred to the display unit 201 according to a predetermined protocol, and the image is displayed on the display unit 201. The BMU (bit move unit) 203, for example, controls data transfer between memory devices (for example, between the VRAM 202 and another memory) and data transfer between memory and an I/O device (for example, the communication unit 209). The input device 204 includes keys, touch panel, or the like for inputting alphanumerics and the like. The CPU 205 controls the devices by executing a control program stored in the ROM 206 and/or the external storage device 208. The ROM 206 stores various control programs and data. Operation contents and methods of the present embodiment will be described in detail below. The RAM 207 includes a work area for the CPU 205, a data saving area used during error processing, a control program loading area, and the like. The external storage device 208 is a non-volatile storage device (such as an HDD or a flash memory) that stores the control programs and data executed in the terminal device. The communication unit 209 is an interface for connecting to a network line such as the Internet in a wired or a wireless manner.

Figure 3:
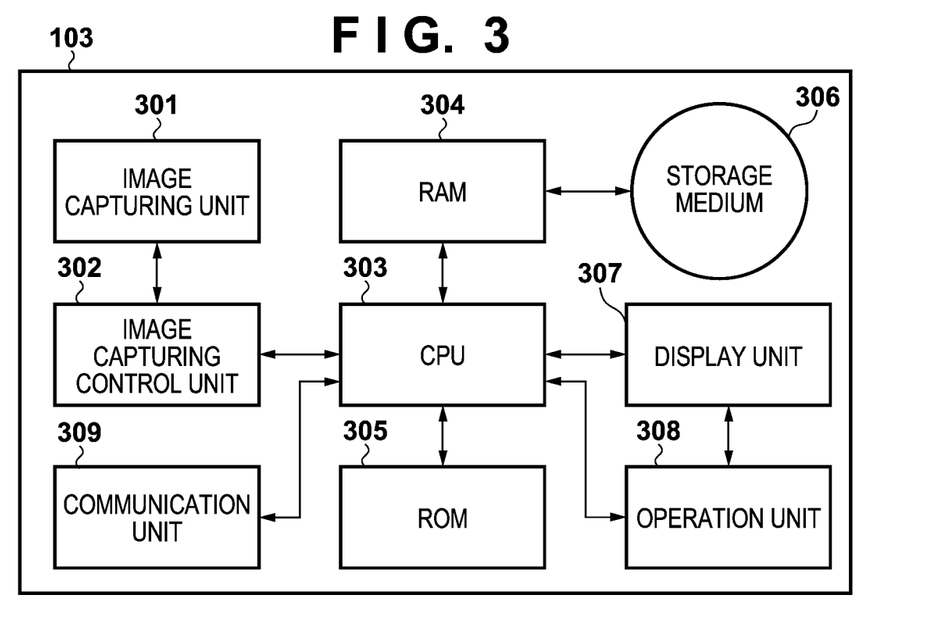
FIG. 3 is a block diagram of an image capturing device according to an embodiment.

FIG. 3 is a block diagram illustrating the configuration of the image capturing device 103 of the present embodiment. Examples of the image capturing device include devices capable of capturing an image of a subject and obtaining image data, such as a digital camera, a digital video camera, and a smartphone. The image capturing device 103 includes an image capturing unit 301, an image capturing control unit 302, a CPU 303, a RAM 304, a ROM 305, a storage medium 306, a display unit 307, an operation unit 308, and a communication unit 309. The image capturing unit 301 is provided with a lens, a diaphragm, an image sensor, and a signal processing circuit and generates digital image data from an optical image. The image capturing control unit 302 controls the image capturing unit 301. The CPU 303 performs various calculations and controls the units constituting the image capturing device 103 according to an input signal and/or program. The RAM 304 stores temporary data and is used for operations of the CPU 303. The ROM 305 stores programs (firmware) for controlling the image capturing device 103, various settings information, and information for uniquely identifying the image capturing device 103 (product name, serial number, and the like). The storage medium 306 stores captured image data and the like. Note that the storage medium 306 can be removed after image capturing and it can be connected to a personal computer (hereinafter, PC) or the like to read out the data. In other words, the image capturing device 103 is only required to include access means for accessing the external storage medium 306 and be able to read out data to the external storage medium 306. A representative example of the storage medium 306 is an SD card, however other storage mediums can be used. The display unit 307 displays viewfinder images while capturing images, displays captured images, displays alphanumerics for interactive operations, and the like. Note that the display unit 307 is not necessarily provided in the image capturing device 103, and the image capturing device 103 is only required to include a display control function for controlling display of the display unit 307. The operation unit 308 is configured to receive operations from a user. A button, lever, touch panel, and the like may be used for the operation unit 308. The communication unit 309 is connected to an external device and transmits and receives control commands and data. Note that the communication unit 309 may communicate via a wired connection such as via a universal serial bus (USB) cable, for example. Also, the communication unit 309 may communicate via a wireless connection such as via a wireless LAN, for example.

Figure 4:
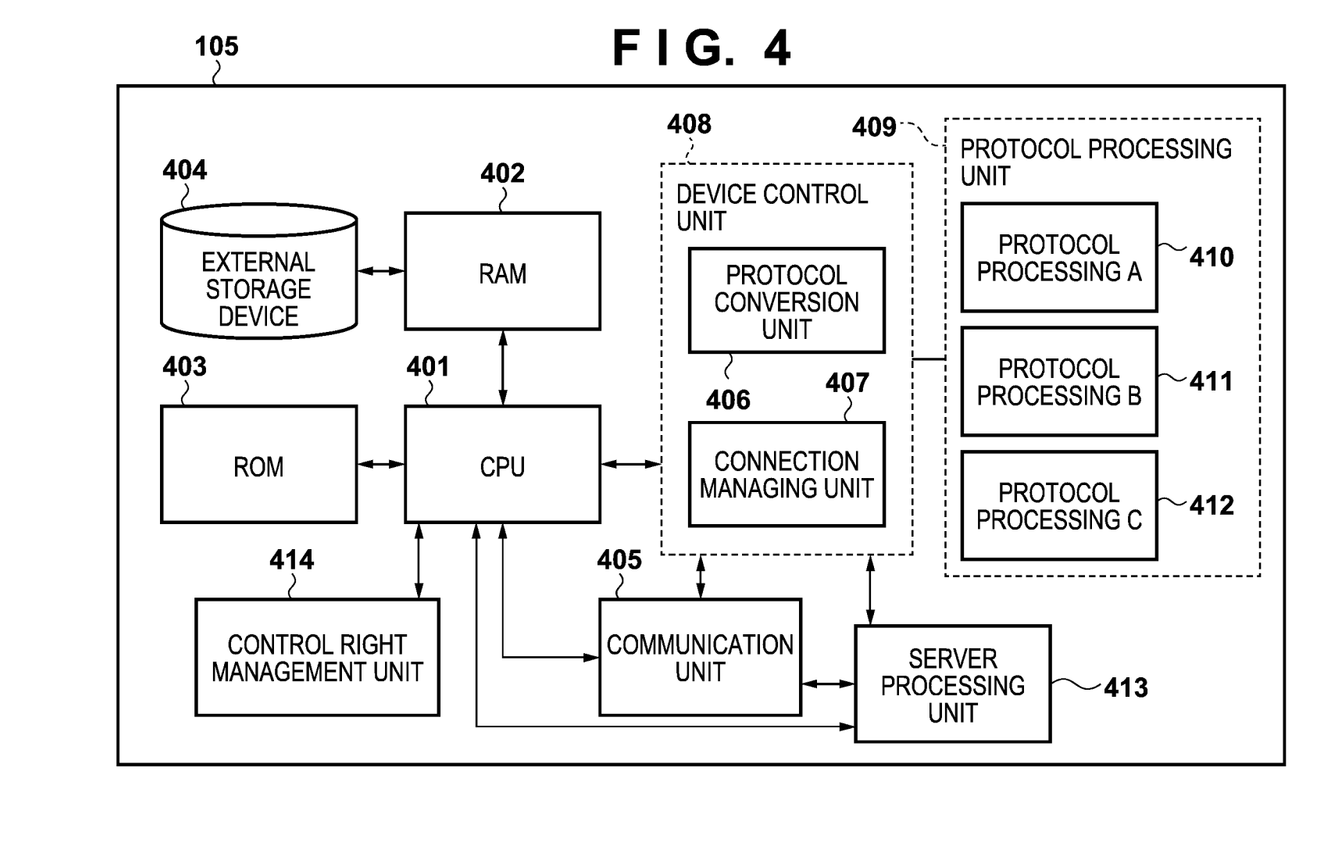
FIG. 4 is a block diagram illustrating a remote capturing system according to an embodiment.

FIG. 4 is a block diagram illustrating the configuration of the remote capturing system 105 of the present embodiment. The remote capturing system 105 includes a CPU 401, a RAM 402, a ROM 403, an external storage device 404, a communication unit 405, a device control unit 408, a protocol processing unit 409, a server processing unit 413, and a control right management unit 414. The device control unit 408 includes a protocol conversion unit 406 and a connection managing unit 407. Also, the protocol processing unit 409 includes a protocol processing unit A 410, a protocol processing unit B 411, and a protocol processing unit C 412.

The CPU 401 controls the units constituting the remote capturing system 105 on the basis of control programs stored in the ROM 403 and/or external storage device 404 and/or input signals. The RAM 402 stores temporary data and/or programs and is used for operations of the CPU 401. The ROM 403 stores programs (firmware) for controlling the remote capturing system 105, various settings information. The external storage device 404 stores the control programs and data executed by the remote capturing system 105.

The communication unit 405 is connected to the image capturing device 103 and the pan-head 104, which are devices controlled by the remote capturing system 105, and transmits and receives control commands and data. Also, the communication unit 405 is connected to the operating terminal 102 and transmits and receives control commands and data. When data received from the operating terminal 102 is via a Web API, the communication unit 405 transfers the data to the server processing unit 413 that functions as a Web API and a Web server. The server processing unit 413 is described below.

The device control unit 408 issues device control commands to the connected devices. Examples include image capturing execution instruction and settings instructions of various parameters (zoom, for example) for the image capturing device 103, execution instructions related to the pan, tilt, and roll of the pan-head 104, and the like. The connection managing unit 407 of the device control unit 408 manages the connection state between the image capturing device 103 and the pan-head 104 that connect to the remote capturing system 105. The protocol conversion unit 406 performs protocol conversion corresponding to different communication protocols being used in the connection for sending/receiving the device control command of the device control unit 408 described above.

The protocol processing unit 409 includes protocol processing units 410 through 412 corresponding to the different communication protocols of the devices that connect to the remote capturing system 105.

The server processing unit 413 forms a HTTP or HTTPS connection between itself and a web browser application (hereinafter, simply web browser) on the client-side operating terminal 102. A HTTP connection is used in the example described below.

In the present embodiment, the operating terminal 102 transmits a HTTP request using a predefined Web API to the server processing unit 413. Then, the server processing unit 413 responds to access from the web browser of the operating terminal 102 using the Web API.

The server processing unit 413 predefines a Web API for acquiring control right to request the control right management unit 414 to perform processing, a Web API corresponding to a command to the device control unit 408 to perform device control, and the like. Known technology relating to the Web API may be used, and as such, a detailed description of the inner workings is omitted. The control right management unit 414 manages the control right for the remote capturing systems 105. When there is access from the plurality of operating terminals 102, i.e., the operating terminal 102a and the operating terminal 102b, the control right management unit 414 performs exclusivity control to grant control right of the remote capturing system 105 to a specific single operating terminal 102. Though there are two operation methods described below, in the present embodiment, the control right management unit 414 manages the control right by giving priority to the operation performed via the web browser that connects to the server processing unit 413 of the remote capturing system 105 for performing an operation over operation of the image capturing device 103 and the pan-head 104.

Hereinafter, an operation method relating to the operating terminal 102 will be described to clarify the operation of the control right management unit 414. In the present embodiment, two operation methods are described.

In the first operation method, the web browser for connecting to the server processing unit 413 of the remote capturing system 105 and performing an operation is stored in the ROM 206 and loaded from here when used. This operation method is used mainly when adjusting devices on site when installing the remote capturing system 105. Specifically, this operation method enables testing of the pan, tilt, and roll of the pan-head 104; the movable area settings (also referred to as configuration setting) such as the zoom of the image capturing device 103; basic operations and test image capturing of the image capturing device 103; and the like.

Note that movable area settings will be described below. The range in which images can be captured by the image capturing device 103 enabled by pan, tilt, and the like is dependent on the location and surrounding environment where the image capturing device 103 is installed. Examples of such cases include moving the image capturing device 103 and the pan-head 104 in a manner so that they do not hit obstacles, or needing to exclude a specific subject from image capturing for privacy reasons. Here, the action of deciding the movable range of the pan-head 104 and the zoomable range of the image capturing device 103 is referred to as setting the movable area. An example of this is a case in which the pan-head 104 has a pan movable area of 360 degrees, but is only panned within a specific angle range. This is the same for tilt and roll. Zoom is as described below. An example of this is a case in which image capturing device 103 has a physical zoom area of from 20 mm to 200 mm and the movable area usable by an ordinary user is a range of only from 30 mm to 100 mm. Also, though further clarified below, even if a zoom request to move to, for example, 200 mm is received from the operating terminal via remote control, the remote capturing system 105 in this case issues to the image capturing device 103 a request to crop to a movable area range upper limit of 100 mm. Note that the pan-head 104 may be provided with a position adjustment mechanism for the zoom lens of the image capturing device 103. In this case, when a request relating to zoom is received remotely, control of the pan-head is performed.

The image capturing device 103 is capable of digitizing an image captured by the image sensor and have a Live View function of a real time display on a back liquid crystal display of the image capturing device 103, and in the present embodiment, the images being displayed via Live View can be transmitted to the remote capturing system 105. Thus, the Live View images are received at the web browser of the operating terminal 102, and operation of the image capturing device 103 can be performed with the Live View images being updated and displayed on the web browser at discretionary intervals. In the present embodiment, the server processing unit 413 defines all of the functions described above in the Web API and receives requests from the operating terminal 102. When the communication unit 405 receives the Web API, it transmits the data to the server processing unit 413. When the server processing unit 413 receives the Web API, the server processing unit 413 analyzes the data, converts the data in data interpretable by the remote capturing system 105, and notifies the protocol conversion unit 406. In the present embodiment, the protocol processing unit A 410 performs protocol processing for the image capturing device 103, and the protocol processing unit B 411 performs protocol processing for the pan-head 104. The protocol conversion unit 406 analyzes the data contents received from the server processing unit 413, instructs the protocol processing unit A 410 in the case of the received data contents being control contents relating to the image capturing device 103, and instructs the protocol processing unit B 411 in the case of the received data contents being control contents relating to the pan-head 104. Note that the processing contents of the protocol processing unit 409 are not limited thereto. Also in the present operation method, in addition to the functions used in adjusting the devices described above, other functions, such as user identification, password management, and the like, may also be provided. However, description of these is omitted.

For the operating terminal 102a to perform operations using the remote capturing system 105 via the web browser described above, control right must be acquired beforehand. Here, the web browser of the operating terminal 102a accesses the remote capturing system 105 via a Web API for acquiring control right. When the communication unit 405 of the remote capturing system 105 receives the Web API, the received Web API is transferred to the server processing unit 413. When the server processing unit 413 receives the Web API for acquiring control right, the control right management unit 414 is notified via the CPU 401. As described above, the control right management unit 414 manages the control right of the remote capturing system 105. In the case in which control right has not been acquired, control right acquisition for the operating terminal 102a, i.e., the requestor, is permitted. When the control right management unit 414 permits control right acquisition, a universally unique identifier (UUID) is generated and stored in the RAM 402. Note that any method may be used for generating the UUID, examples of which include using media access control (MAC) addresses or time information. Also, the control right management unit 414 notifies the server processing unit 413 via the CPU 401 of the generated UUID and the control right acquisition. The server processing unit 413, via the communication unit 405, for the operating terminal 102a, adds a status code normal to the response of the Web API for obtaining control right and adds a UUID to the response body and transmits this response to the operating terminal 102a, i.e., the requestor. Hereafter, with the operating terminal 102a, operations using the web browser described above can be performed.

Note that the first operation method has been described above. In this method, operations are performed by the operating terminal 102 connecting to the server processing unit 413 of the remote capturing system 105, and the operating terminal 102 and the remote capturing system 105 can only be controlled on a 1 to 1 basis.

In the second operation method, an application program for remote control (hereinafter, remote control application) is stored in the ROM 206, loaded, and executed. The present operation method is mainly used for the purpose of content creation using captured images of subjects, and is for performing detailed operations of the pan-head 104 and the image capturing device 103 provided in the remote capturing system 105 at a low latency. Specific examples are described below.

Examples of operations of the pan-head 104 include pan, tilt, and roll operations and homing and preset pan, tilt, and roll movement to a preset position. Examples of the operations of the image capturing device 103 include image quality adjustment, such as zoom, focus, exposure, ISO, white balance, and the like; normal image capturing; continuous shooting; and another image capturing control operations. Note that as described above, the image capturing device 103 is capable of digitizing an image captured by the image sensor and has a Live View function, i.e., real time display on a back liquid crystal display of the image capturing device 103, and in the present embodiment, the images being displayed via Live View can be transmitted to the remote capturing system 105. Thus, operation of the image capturing device 103 can be performed while Live View images are displayed in the control application.

For the operating terminal 102b to perform operations using the remote capturing system 105 via the control application described above, control right must be acquired beforehand. Here, the control application of the operating terminal 102b accesses the remote capturing system 105 via a Web API for acquiring control right. When the communication unit 405 of the remote capturing system 105 receives the Web API, it is transferred to the server processing unit 413. When the server processing unit 413 receives the Web API for acquiring control right, the control right management unit 414 is notified via the CPU 401. As described above, the control right management unit 414 manages the control right of the remote capturing system 105. In the case in which control right has not been acquired, control right acquisition for the operating terminal 102b, i.e., the requestor, is permitted. When the control right management unit 414 permits control right acquisition, a UUID, as described above, is generated and stored in the RAM 402. The control right management unit 414 notifies the server processing unit 413 via the CPU 401 of the generated UUID and the control right acquisition. The server processing unit 413, via the communication unit 405, adds a status code normal to the response of the Web API for obtaining control right and adds a UUID to the response body and transmits this response to the operating terminal 102b. Hereafter, with the operating terminal 102b, operations using the control application described above can be performed.

The control application of the operating terminal 102b acquires the control right enabling operation. To decrease control delay as much as possible, the control application sends control instruction using a specific protocol to a pre-selected specific network port of the remote capturing system 105. As described above, in the present embodiment, the protocol processing unit A 410 performs protocol processing for the image capturing device 103, and the protocol processing unit B 411 performs protocol processing for the pan-head 104. In this example, the control instruction for the image capturing device 103 uses network port "10001" and the control instruction for the pan-head 104 uses network port "10002". In this example, in the case in which the operating terminal 102b has acquired control right as described above, when image capture instructions are sent to the network port "10001", the communication unit 405 transmits received data to the protocol conversion unit 406. In the present embodiment, a specific protocol processing is stored in the payload of a network packet. Thus, when the protocol conversion unit 406 determines that the data is from the network port "10001", the payload is extracted and instructions are sent to the protocol processing unit A 410. In a similar manner, in the case in which the data is from the network port "10002", instructions are sent to the protocol processing unit B 411. By performing processing in this manner, the control application of the operating terminal 102b can decrease control delay after control right acquisition. Note that in the example described above, the network ports "10001" and "10002" are used. However, the network ports may have a discretionary number and be changeable from the control application. Also, the processing contents of the protocol conversion unit 406 and the protocol processing unit 409 are not limited to that described in this example.

Furthermore, in the method for using and operating the remote capturing system 105 via the control application, the operating terminal 102 can control the remote capturing system 105 on a 1 to plurality basis, as long as control right can be acquired.

Next, the processing of determining whether or not to allow connection in response to a connection request from an external unit (operating terminal) performed by the control right management unit 414 of the remote capturing system 105 will be described with reference to FIGS. 5 through 6. Note that in the example described below, the operating terminal 102a performs operation using a web browser, the operating terminal 102b performs operation using a program of a control application, the operating terminal 102c performs operation using a web browser, and the operating terminal 102d performs operation using a program of a control application. Also, the remote capturing system 105 determines, when an access request is received from the operating terminal 102, whether a web browser or a remote control application was used by determining whether information for distinguishing whether a web browser or a remote control application was used is contained in the request body of the Web API for obtaining control right described below. Note that in the case in which the protocol used in an access request by a web browser and a remote control application is different, the remote capturing system 105 may determine whether a web browser or a remote control application was used on the basis of the protocol of the access request received from the operating terminal 102.

Figure 5:
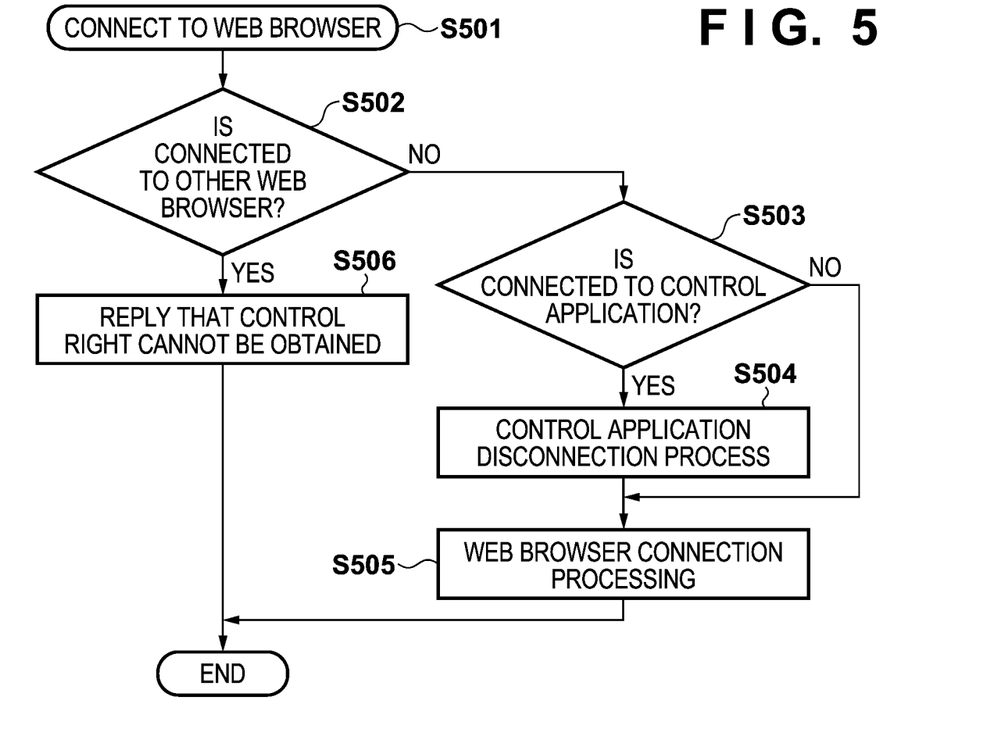
FIG. 5 is a flowchart illustrating the process of a remote capturing system according to an embodiment receiving a connection request from a web browser.

FIG. 5 is a flowchart illustrating the processing of the control right management unit 414 of the remote capturing system 105a when the operating terminal 102a using a web browser connects to the remote capturing system 105a.

First, in step S501, connection to the remote capturing system 105a from the operating terminal 102a using a web browser is detected. Specifically, as described above, the web browser of the operating terminal 102a accesses the server processing unit 413 via the communication unit 405 of the remote capturing system 105a via a Web API for acquiring control right. When the server processing unit 413 receives the Web API for acquiring control right, the control right management unit 414 is notified via the CPU 401.

Next, the control right management unit 414 determines whether or not the remote capturing system 105a is currently connected to another web browser. For example, in the case in which the control right management unit 414 determines that the operating terminal 102c has already acquired control right of the remote capturing system 105a using a web browser, the control right management unit 414 determines that the remote capturing system 105a is currently connected to another web browser. In this case, the control right management unit 414 notifies the server processing unit 413 via the CPU 401 that control right acquisition is not possible (connection is not possible). When the server processing unit 413 receives this notification, the server processing unit 413 adds an error value as a status code of the response of the web API for obtaining control right and transmits the response to the operating terminal 102a via the communication unit 405 (step S506). In this way, the operating terminal 102a determines that it could not connect to the remote capturing system 105a and notifies the user via the web browser, thus ending the process. Note that instead of transmitting a response in step S506, the connection request from the operating terminal 102a may be ignored.

On the other hand, in step S502, in the case in which the control right management unit 414 determines that another web browser has not acquired control right of the remote capturing system 105a, the process moves to step S503. In step S503, the control right management unit 414 determines whether or not another control application is connected. As described above, the control right management unit 414 manages the control right by giving priority to the operation performed via the web browser that connects to the server processing unit 413 of the remote capturing system 105 for performing an operation. For example, in the case in which the operating terminal 102d has acquired control right of the remote capturing system 105a using a control application, the control right management unit 414 moves the process to step S504, and the control application of the operating terminal 102d is disconnected, giving priority to operation from the operating terminal 102a using a web browser. Here, when the user is disconnected, the user may be notified by the control application of the operating terminal 102d that the control right has been passed to an operation via a web browser. Also, when the control application of the operating terminal 102d is disconnected, waiting for processing currently being executed and the like may be addressed.

In step S503, in the case in which the control right management unit 414 determines that another control application is connected, or, in step s504, in the case in which the control right management unit 414 has completed the processing for disconnecting the control application of the operating terminal 102d, the control right management unit 414 moves the process to step S505. In step S505, the control right management unit 414 determines in response to a request from the operating terminal 102a whether connection is possible and performs processing for connecting to the web browser of the operating terminal 102a. Specifically, the control right management unit 414 sets a status code of normal complete for the response for the Web API for obtaining control right from the web browser of the operating terminal 102a and adds a UUID to the response body and transmits this response.

Figure 6:
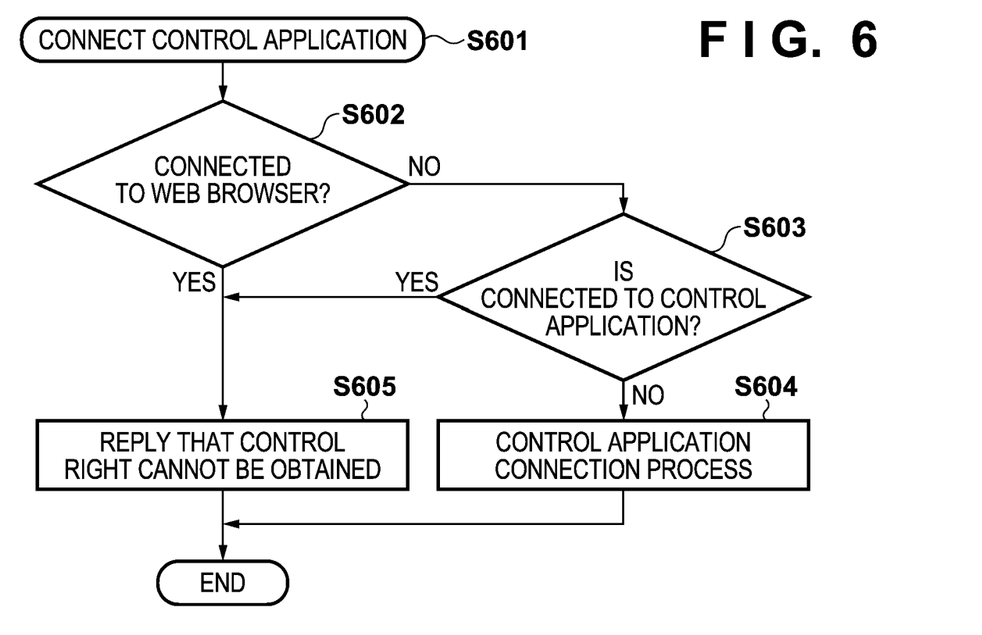
FIG. 6 is a flowchart illustrating the process of a remote capturing system according to an embodiment receiving a connection request from a remote control application.

FIG. 6 is a flowchart illustrating the processing of the control right management unit 414 of the remote capturing system 105b when the operating terminal 102b using a remote control application connects to the remote capturing system 105b.

First, in step S601, the control right management unit 414 detects a connection to the remote capturing system 105b using a control application. Specifically, as described above, when the control application of the operating terminal 102b accesses the server processing unit 413 via the communication unit 405 of the remote capturing system 105b via a Web API for acquiring control right, the server processing unit 413 notifies the control right management unit 414 via the CPU 401.

In step S602, the control right management unit 414 determines whether or not the remote capturing system 105b is currently connected to another web browser. As described above, the control right management unit 414 manages the control right by giving priority to the operation performed via the web browser that connects to the server processing unit 413 of the remote capturing system 105 for performing an operation. Thus, in the case in which the operating terminal 102c has already acquired control right of the remote capturing system 105b using a web browser, the control right management unit 414 moves the process to step S605. In step S605, the control right management unit 414 notifies the server processing unit 413 via the CPU 401 that control right acquisition is possible. When the server processing unit 413 receives this notification, the server processing unit 413 adds an error value as a status code of the response of the web API for obtaining control right and transmits the response to the operating terminal 102b via the communication unit 405. In this way, the operating terminal 102b determines that it could not connect to the remote capturing system 105b and notifies the user via the control application, thus ending the process. Note that instead of transmitting a response in step S605, the connection request from the operating terminal 102b may be ignored.

In step S602, in the case in which the control right management unit 414 determines that another web browser has not acquired control right of the remote capturing system 105b, the control right management unit 414 moves the process to step S603. In step S603, the control right management unit 414 determines whether or not another control application is connected. In the present embodiment, the control right management unit 414 allows two or more control applications to acquire control right based on order of access. Thus, in the case in which another control application of the operating terminal 102d has acquired control right (YES in step S603), the control right management unit 414 notifies the server processing unit 413 via the CPU 401 that control right acquisition is not possible. When the server processing unit 413 receives this notification, the server processing unit 413 adds an error value as a status code of the response of the web API for obtaining control right and transmits the response to the operating terminal 102b via the communication unit 405 (step S605). In this way, the operating terminal 102b determines that it could not connect to the remote capturing system 105b and notifies the user via the control application, thus ending the process.

On the other hand, in the case in which the control right management unit 414 determines that there is no connection with another control application (NO in step S603), the process moves to step S604. In step S604, the control right management unit 414 performs processing for connecting to the control application of the operating terminal 102b. Specifically, a status code of normal complete is set for the response for the Web API for obtaining control right from the control application of the operating terminal 102b, a UUID is added to the response body, and the response is transmitted.

Note that while the operating terminal 102a has acquired the control right of the remote capturing system 105 using the web browser described above, commands other than commands using the Web API for obtaining control rights from the control application of the operating terminal 102b are ignored by the remote capturing system 105.

According to the process described above, by having exclusive control right of the remote capturing system 105, the control right management unit 414 can give priority to the operation performed via the web browser of the operating terminal 102 that connects to the server processing unit 413 of the remote capturing system 105 for performing an operation.

Second Embodiment

The second embodiment will be described below. The second embodiment is different from the first embodiment in that it relates to a case in which the operating terminal 102 acquires control right, but then no operations are performed. Configurations and processing identical to those in the first embodiment are omitted, and only the differences will be described below.

When the operating terminal 102 acquires control right, the operating terminal 102, the operating terminal 102 continuously and periodically transmits a Web API for connection status confirmation to the server processing unit 413 via the communication unit 405 of the remote capturing system 105. The Web API for connection status confirmation is defined by the server processing unit 413. The Web API for connection status confirmation corresponds to Keep-Alive, and identifies the connection partner on the basis of the UUID added when control right was acquired in the header of the body of the Web API. The operating terminal 102 can be used in both of the operation methods described in the first embodiment, and in both of these methods, the Web API for connection status confirmation is periodically issued. In the case in which a Web API for connection status confirmation from the operating terminal 102 is not confirmed within a predetermined period of time, the control right management unit 414 of the remote capturing system 105 releases the control right and disconnects. Here, the threshold indicating the preset predetermined period of time may be a fixed value such as 30 seconds, or may be a threshold set differently for each of the two operation methods. Also, for either of the operation methods, by measuring the response time when transmitting a Web API for obtaining control rights, a new threshold equaling the preset threshold plus the response time may be used. In this case in which the threshold described above is 0, when the operating terminal 102 acquires the control right, the control right may be continuously held until the operating terminal 102 clearly disconnects. In this case, a system administrator who is not the user who has acquired the control right must be able to forcefully release the control right. Here, by the server processing unit 413 of the remote capturing system 105 being provided with an administrator user and the administrator user of the server processing unit 413 login as the administrator user using a Web API for administrator user login, control right can be forcibly released.

According to the process described above, even in the case in which the operating terminal 102 acquires control right but no operations are performed, operations via the web browser that connects to the server processing unit 413 of the remote capturing system 105 for performing operations can always be given priority.

Preferred embodiments according to the present invention have been described above. However, the present invention is not limited to these specific embodiments and include various embodiments without departing from the scope of the claims. Parts of the embodiments described above may be combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-143311, filed Aug. 2, 2019, which is hereby incorporated by reference herein in its entirety.

What is claimed is:

1. A control apparatus that controls a pan-head, to which an image capturing device is mountable and which includes a drive unit that drives the image capturing device, the apparatus comprising:
   a communication unit that communicates with a terminal on a network;
   a control unit that controls the drive unit according to a request received via the communication unit;
   a determination unit that, in a case in which a connection request is received from a terminal via the communication unit, determines whether a first application program for configuration setting relating to the pan-head or a second application program for remote control of the pan-head is being executed in the terminal;
   a management unit that manages a terminal authorized for connection; and
   a decision unit that, in a case in which a new connection request is received, decides whether connection is possible or impossible on the basis of a result of a determination of the determination unit and information managed by the management unit.

2. The apparatus according to claim 1, wherein the decision unit
   decides that connection is impossible for the new connection request in the case in which a currently connected terminal is executing the first application program, and
   in a case in which the currently connected terminal is executing the second application program and the new connection request is a request from a terminal executed using the first application program, disconnects communication with the currently connected terminal executing the second application program and decides that connection is possible for an operating terminal issuing the new connection request.

3. The apparatus according to claim 2, wherein the decision unit, in a case in which a currently connected terminal is executing the second application program and the new connection request is a request from a terminal executed using the second application program, decides that connection is impossible for the new connection request.

4. The apparatus according to claim 1, wherein the decision unit transmits information indicating connection is impossible to an operating terminal for which connection is impossible was decided or ignores a request for connection.

5. The apparatus according to claim 1, wherein the decision unit transmits, to an operating terminal for which connection is possible was decided, an ID generated for identifying the operating terminal and information indicating connection is possible.

6. The apparatus according to claim 5, wherein the management unit manages the operating terminal for which connection is possible was decided using the ID.

7. The apparatus according to claim 1, wherein the connection request includes information of an application being executed by a terminal that transmitted the connection request, and
   the determination unit determines on the basis of information included in a connection request received.

8. The apparatus according to claim 1, wherein the decision unit,
   in a case in which preset information is received from a currently connected operating terminal managed by the management unit within a predetermined period of time, maintains connection status, and,
   in a case in which the information is not received within the predetermined period of time, disconnects connection with the operating terminal managed by the management unit.

9. A method of controlling a control apparatus that controls a pan-head, to which an image capturing device is mountable and which includes a drive unit that drives the image capturing device, the method comprising:
   (a) communicating with a terminal on a network using a communication unit;
   (b) controlling the drive unit according to a request received via the communication unit;
   (c) in a case in which a connection request is received from a terminal via the communication unit, determining whether a first application program for configuration setting relating to the pan-head or a second application program for remote control of the pan-head is being executed in the terminal;
   (d) managing a terminal authorized for connection; and
   (e) in a case in which a new connection request is received, deciding whether connection is possible or impossible on the basis of a result of a determination in the determining and information managed in the managing.

10. A non-transitory computer-readable storage medium storing a program which, when read and executed by a computer, causes the computer to execute steps of a method of controlling a control apparatus that controls a pan-head, to which an image capturing device is mountable and which includes a drive unit that drives the image capturing device, the method comprising:
   (a) communicating with a terminal on a network using a communication unit;
   (b) controlling the drive unit according to a request received via the communication unit;
   (c) in a case in which a connection request is received from a terminal via the communication unit, determining whether a first application program for configuration setting relating to the pan-head or a second application program for remote control of the pan-head is being executed in the terminal;
(d) managing a terminal authorized for connection; and
(e) in a case in which a new connection request is received, deciding whether connection is possible or impossible on the basis of a result of a determination in the determining and information managed in the managing.

* * * * *